US005603549A

United States Patent [19]
Chen et al.

[11] Patent Number: 5,603,549
[45] Date of Patent: Feb. 18, 1997

[54] NESTABLE MULTIPIECE TRUCK CAB ROOF FAIRING ASSEMBLY

[75] Inventors: David E. Chen, Fort Wayne; David F. Lewis, Leo, both of Ind.

[73] Assignee: Navistar International Transportation Corp., Chicago, Ill.

[21] Appl. No.: 420,920

[22] Filed: Apr. 12, 1995

[51] Int. Cl.$^6$ .................................................. B62D 35/00
[52] U.S. Cl. .................................... 296/180.1; 296/180.2; 248/503
[58] Field of Search ............................ 296/180.1–180.5, 296/901; 248/300, 220.1, 500, 501, 503; 211/41; 410/78

[56] References Cited

U.S. PATENT DOCUMENTS

| 89,278 | 4/1869 | Blodgett | 211/41 |
|---|---|---|---|
| 3,551,014 | 12/1970 | Tamruchi | 296/901 X |
| 3,596,979 | 8/1971 | Hablitzel et al. | 296/185 |
| 3,934,923 | 1/1976 | Lissaman et al. | 296/180.3 X |
| 4,084,846 | 4/1978 | Wiley, Jr. | 296/180.3 |
| 4,784,424 | 11/1988 | Wiley, Jr. | 296/180.2 |
| 4,917,435 | 4/1990 | Bonnett et al. | 296/190 |
| 4,957,322 | 11/1990 | Marlowe et al. | 296/180.2 |
| 5,249,837 | 10/1993 | Luttrell | 296/180.3 |
| 5,346,274 | 9/1994 | Syamal et al. | 296/180.1 |
| 5,383,702 | 1/1995 | Matheson | 296/157 |

FOREIGN PATENT DOCUMENTS

| 250511 | 10/1987 | German Dem. Rep. | 410/78 |
|---|---|---|---|
| 2743203 | 4/1979 | Germany | 296/180.3 |
| 200581 | 8/1990 | Japan | 296/180.1 |

*Primary Examiner*—Dennis H. Pedder
*Attorney, Agent, or Firm*—Dennis K. Sullivan

[57] ABSTRACT

A multipiece aerodynamic fairing having horizontally divided sections which are nestable for transport, being engaged together by a bracket having multiple attachment points for independent mounting of each of the sections thereto. The bracket may be mounted to a cab roof for mounted transport and then continued in use for mounting of the bottom fairing section to the cab or, for independent transport, mounted after the multipiece fairing attached thereto is delivered, as in the case of after-market installation. The fairing sections are provided with interlocking vertical or horizontal tongue-in-groove joints, preferably made permanent by adhesive, to achieve a strong joint structure in the operating configuration of the fairing and to cause the exterior surfaces of the fairing pieces to achieve registry and thereby achieve a smooth aerodynamic shape and appearance in the assembled fairing.

17 Claims, 3 Drawing Sheets

NESTABLE MULTIPIECE TRUCK CAB ROOF FAIRING ASSEMBLY

BACKGROUND OF THE INVENTION

The present invention relates to a truck cab roof multipiece fairing assembly wherein the fairing pieces are nested for shipment and attached to the cab roof by a mounting bracket having multiple attachment points for independent nested mounting of the fairing pieces and wherein the fairing pieces are joined through the use of interlocking vertical or horizontal tongue-in-groove joints to cause the exterior surfaces of the fairing pieces to achieve registry and thereby achieve a smooth aerodynamic shape and appearance in the assembled fairing.

THE PRIOR ART

Multipiece fairings for a truck cab roofs are previously known as shown, for example, in the Wiley U.S. Pat. Nos. 4,784,424 and 4,919,472 which disclose the concept of nesting upper and lower fairing sections, the sections being hinged together toward a front end thereof with the upper section sidewalls engaging onto and forming a continuation of the sidewalls of the lower section when the upper section is raised above the lower section about the hinge.

Further, the Marlowe U.S. Pat. No. 4,957,322 discloses a multipiece truck cab roof and fairing combination, with among other things, a substantially horizontal parting line the roof and fairing members. The joint formed about this parting line is described as being substantially smooth to enhance aerodynamics thereabout but no teaching is made as to how the smooth joint is achieved.

SUMMARY OF THE INVENTION

The multipiece aerodynamic fairing of the present invention allows for common fairing pieces to be used on different truck models, requiring modification only to the cab engaging sections. Moreover, the pieces are nestable for transport and engaged together by a bracket having multiple attachment points for independent mounting of each of the pieces thereto. The bracket may be mounted to a cab roof for mounted transport and then continued in use for mounting of the bottom fairing piece to the cab or, for independent transport, mounted after the multipiece fairing attached thereto is delivered, as in the case of after-market installation. Additionally, the fairing pieces are provided with interlocking vertical or horizontal tongue-in-groove joints, preferably solidified by adhesive, to achieve a strong joint structure and to cause the exterior surfaces of the fairing pieces to achieve registry and thereby achieve a smooth aerodynamic shape and appearance in the assembled fairing.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENTS

Figure 1:
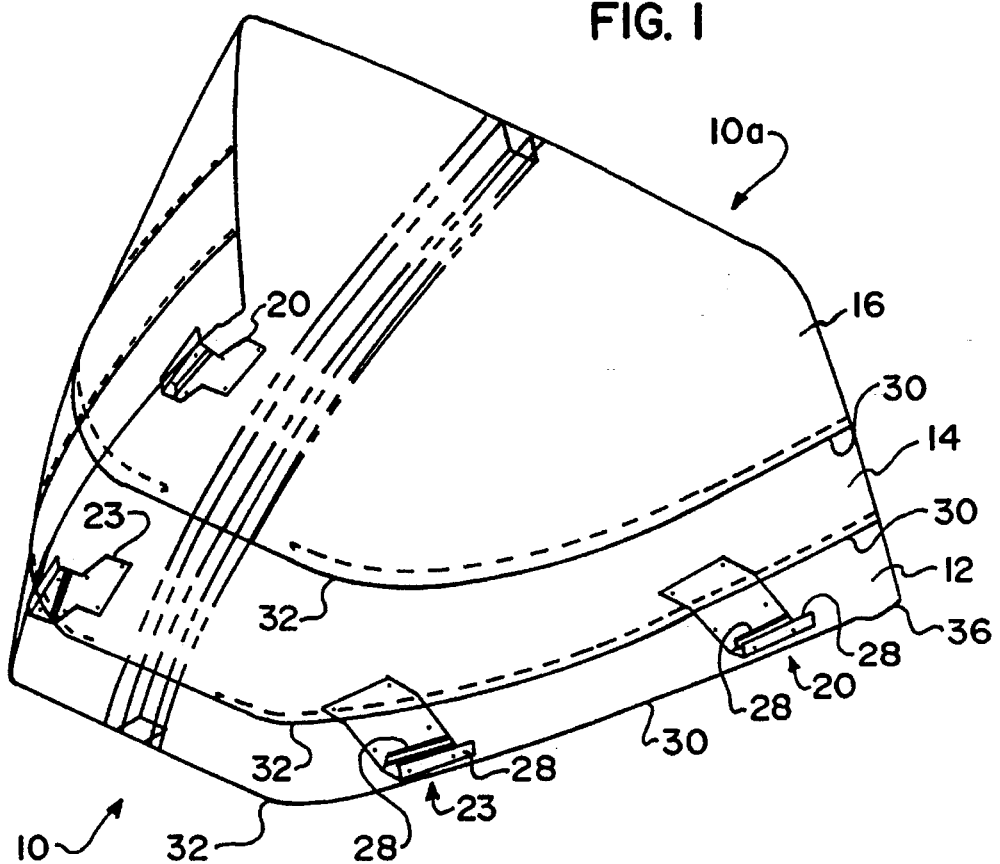
FIG. 1 is a perspective view of a three piece fairing made in accordance with the teachings of the present invention.
Figure 2:
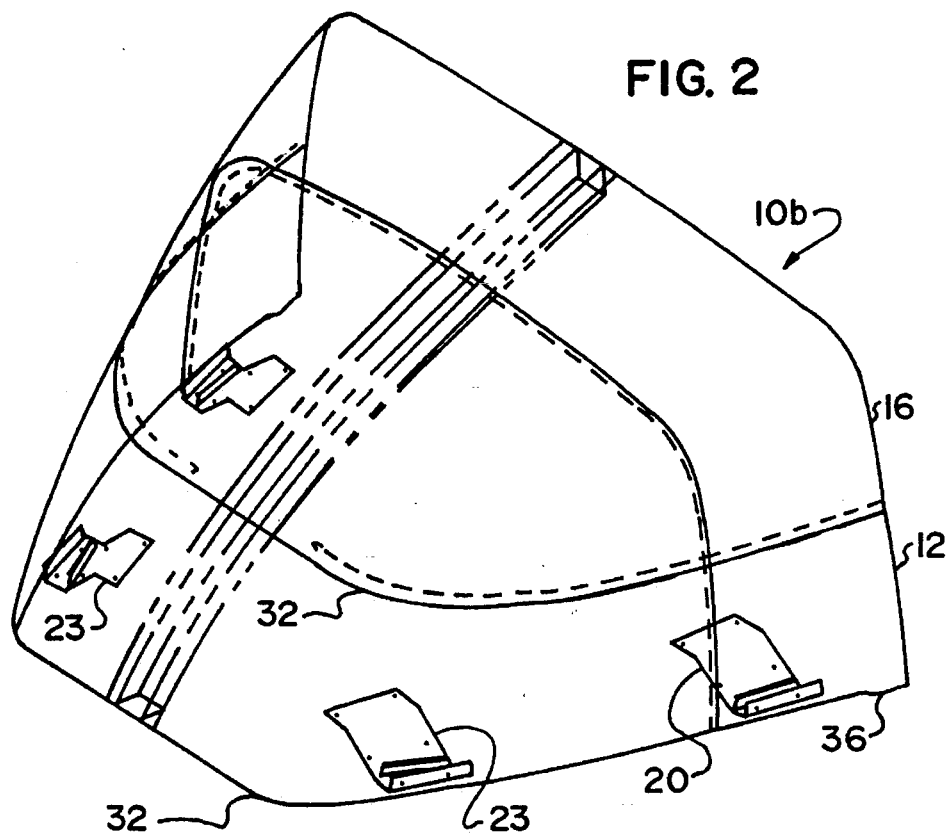
FIG. 2 is a perspective view of a four piece fairing.
Figure 3:
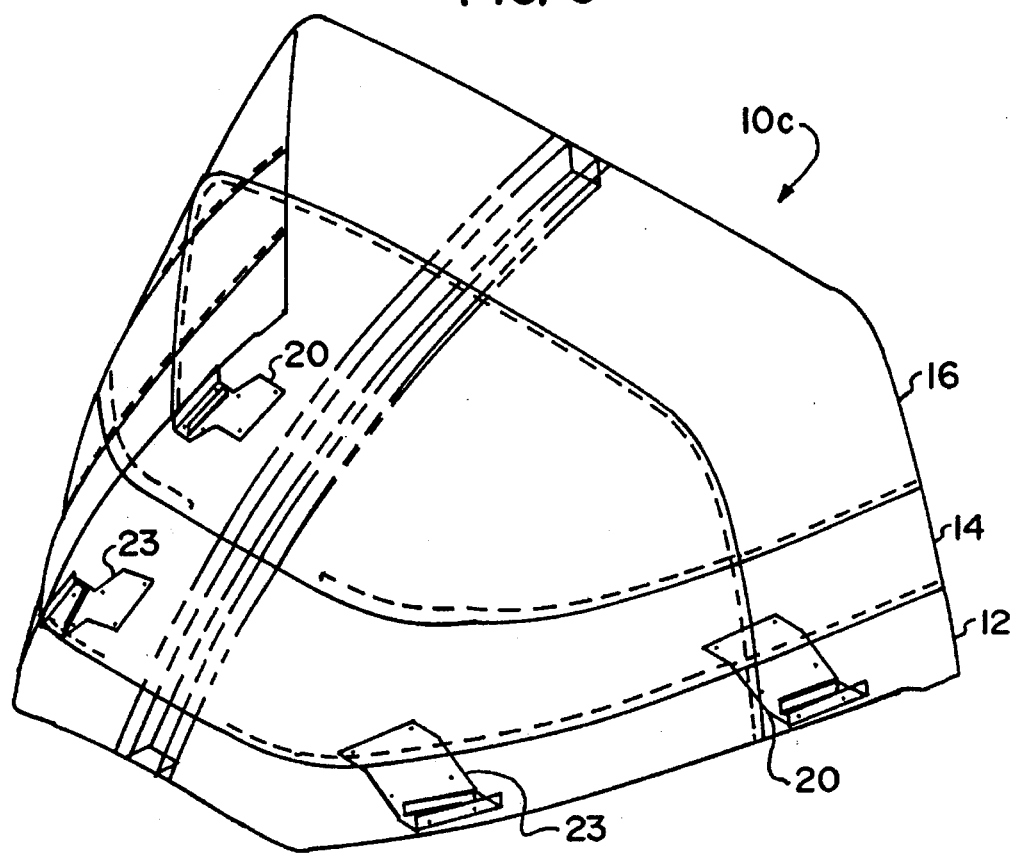
FIG. 3 is a perspective view of a six piece fairing.

Referring now to the drawings in greater detail, there is illustrated in FIGS. 1–3, a plurality of embodiments of the multipiece nestable, stackable fairing assembly 10 made in accordance with the teachings of the present invention.

Figure 6:
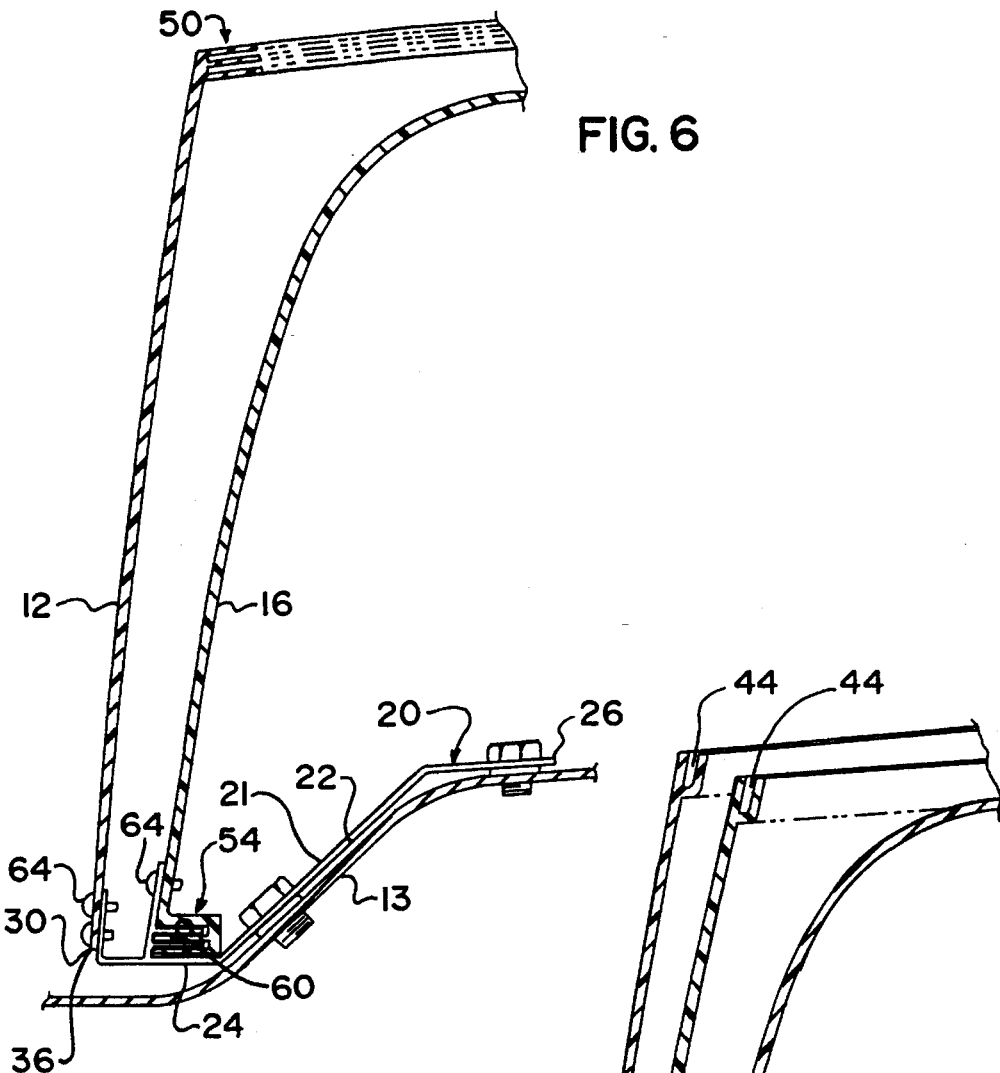
FIG. 6 is a cross-section through two nested fairing pieces engaged to a mounting and support bracket of the assembly accommodating a first joint form, the bracket being mounted to a partially shown cab roof.

FIG. 1 shows a three piece embodiment 10a where the fairing is divided into three sections along horizontal parting lines, a bottom section 12 which mounts to a roof partially shown at 13 in FIG. 6 of a highway truck tractor (not shown), an intermediate section 14, which is mounted to the bottom section 12, and a top section 16 which encloses the upper portion of the fairing assembly 10. The side walls of the fairing assembly 10 taper inwardly upwardly as well as outwardly rearwardly so that the intermediate and top sections 14 and 16 can nest one inside the other, with both fitting into a space defined within the bottom section 12, thereby creating a package for transport which is about one third the normal height of a complete fairing.

For the sake of manufacturing convenience and enabling modular assembly of various fairing configurations, the horizontal fairing sections may be formed of vertically joined pieces as shown in the examples of FIGS. 2 and 3 where sections 12 and 16 of embodiment 10b or 12, 14 and 16 of embodiment 10c. The pieces forming each horizontal section need only be mated along the vertical parting lines to form the horizontally extending sections 12, 14 and 16 before the horizontal sections are nested and mounted for transport or joined to each other to form fairing assembly 10.

In this respect, sections forming an entire fairing previously have been joined to one another by forming a flange on each piece perpendicular to the surface and bolting the flanges together. These bolted flange mountings are eliminated in the embodiments disclosed herein.

Figure 4:
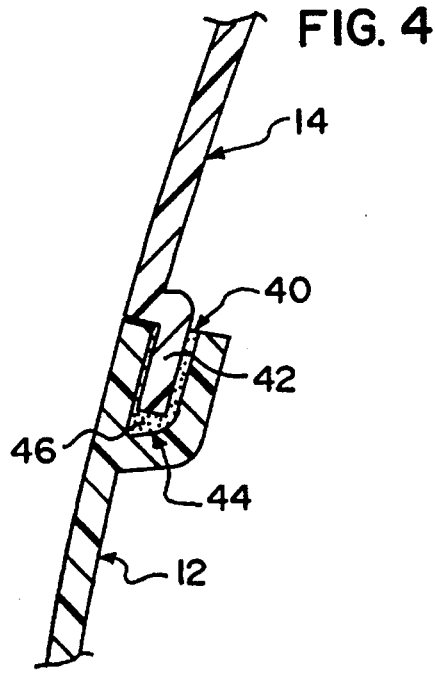
FIG. 4 is a cross-section through one form of joint used in attaching fairing pieces together.

Instead, in a preferred embodiment shown in FIG. 4, the fairing sections 12, 14 and 16 may be joined together by a tongue-in-groove joint 40 with vertically depending tongue 42 formed on the intermediate section being slid downwardly into an upwardly opening groove 44 formed along the parting line on the interior wall of the bottom section 12, the groove 44 preferably being filled with an adhesive 46 to make a strong permanent joint which will resist the large aerodynamic forces imposed on the fairing at highway speeds.

Figure 5:
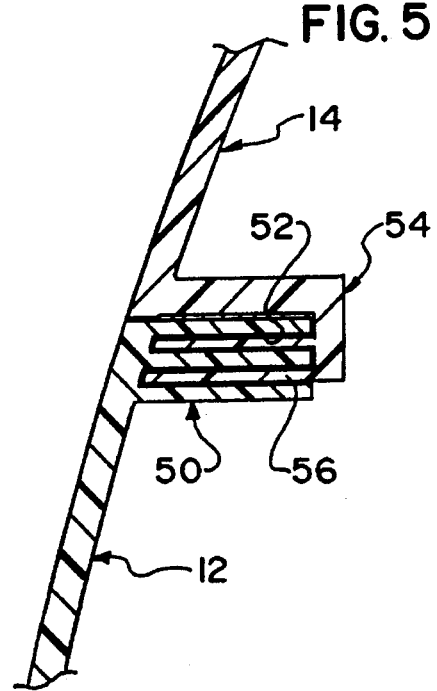
FIG. 5 is a cross-section through a second form of joint used in attaching fairing pieces together.

In an alternative embodiment shown in FIG. 5, an inwardly extending flange 50 having one or a plurality of horizontal grooves 52 therein disposed on section 12 may be mated against an inwardly extending flange 54 on an adjacent section 14, this flange 54 having a one or a plurality of outwardly extending tongues 56 thereon which engage within the grooves 52 when the upper section 14 is slid forwardly over the lower section 12. Since the fairing tapers inwardly upwardly and also tapers inwardly forwardly, the outer periphery of the tongues 54 will be offset inwardly from the periphery of the grooves 54 initially and the tongues 54 will begin to gradually engage the grooves 52 as the upper section 54 is moved forwardly until complete engagement occurs when the exterior surfaces of the upper and lower sections become aligned to provide a smooth exterior surface.

When it is chosen to divide a fairing section vertically, the joint at and between the vertical divisions may also be formed in the same manner, without need of additional mounting members.

When the fairing sections are nested for transport, to keep the sections 12, 14 and 16 from shifting relative to one another, a dual purpose bracket 20 not only will be used to engage the sections 12, 14 and 16 together for transport, but is also the mounting bracket 20 for attaching the bottom section 12 to the cab roof 13.

As shown in FIG. 6, the bracket 20 comprises an angular mounting plate 21 which conforms to the contour of the truck cab roof 13 which underlies the bracket 20. In the embodiment illustrated, the cab roof is formed with a contoured top surface having a hump therein. Thus, the mounting plate 21 has a center portion 22 which extends angularly upwardly from a generally horizontal bottom portion 24 and terminates in a generally horizontal upper portion 26. If the roof 13 were flat, the mounting plate 21 would be flat. Suitable fastening means secure the bracket 20 to the cab roof, the capscrews illustrated engaging a roof reinforcement member (not shown) beneath the roof skin.

Figure 7:
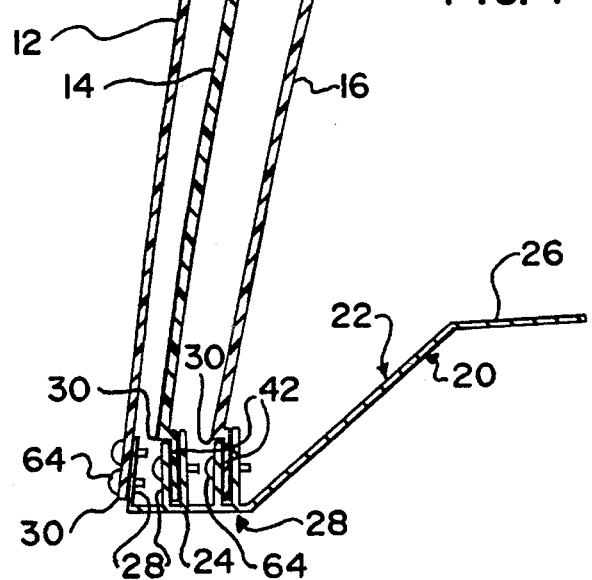
FIG. 7 is a cross sectional view through two nested fairing pieces engaged to a mounting and support bracket of the assembly accommodating a second joint form.

Provided on the lower portion 24 of the mounting bracket 20 are a plurality of upstanding flanges 28 which are oriented to accommodate the end edge configurations of an equal plurality of the fairing sections. In FIG. 6, the mounting for transport on the cab roof of fairing sections 12 and 16 for the two piece fairing 10b is illustrated while in FIG. 7, the mounting of fairing sections 12, 14 and 16 for the three piece fairings 10a or 10c are illustrated, such mounting being not necessarily on the cab roof.

In this respect, the fairing sections 12, 14 and 16 typically have a linear side lower edge 30 and have curving front corner edges 32 as shown in FIGS. 1–3. To provide maximum stability to the assembly 10, whether nested, or stacked for use, it is proposed to provide at least one bracket 20 toward each rear corner 36 of the assembly 10 and further to provide at least one bracket 23 slightly to the rear of the front curved corner 32 of the assembly 10. As shown, the flanges 28 on each rear corner bracket 20 may be parallel to one another in the fore-and-aft direction, easily accommodating the sections 12, 14 and 16. However, the forward brackets 23 must take into account that the lower peripheries of the intermediate and upper sections 14 and 16 are smaller than the lower periphery of the bottom section 12 due to the upward and inward tapering of the fairing 10, especially at the forward portion, as well as the curvature of the front corners 32 of the sections 12, 14 and 16. Thus, as shown in FIGS. 1–3, the flanges 28 of these forward brackets 23 must be set thereon at an angle and appropriately placed to accommodate such tapering and curvature. For example, the forward bracket 23 may be fixed to the fairing sections 12, 14 and 16 and any underlying support surface at a position sufficiently rearward of the front corner 32 of the bottom fairing section 12 to ensure engagement with the front corner 32 of uppermost fairing section, 16 and the rear bracket 20 may be positioned forwardly of the rear corner 36 of the bottom fairing section 12 to accommodate shortening of the ascending sections 14 and 16 to be mounted thereto, as required.

In a simple version, the bracket flange 28 may be a single upstanding member to which the sections 12, 14 and 16 may be engaged by bolts 64. However, the bracket flanges 28 may be designed to accommodate the configuration of the respective fairing joint to be mounted thereto, rather than each existing as a single upstanding member. For example, as shown in the tongue-in-groove embodiment of FIG. 7, the inner bracket flange 28 may be U-shaped in cross-section, with the tongue 42 formed on the lower edge 30 of an upper nested section 14 and 16, seating therewithin.

Further, when the horizontal grooved flange 54 of the multiple grooved configuration shown in FIG. 6 is provided on the nesting upper section 14 and 16, the bracket flange 28 may be provided with inwardly extending grooves 60 within which the tongues 56 may be slidingly engaged.

As described above, the fairing assembly of the present invention provides a number of advantages, some being described above and others being inherent in the invention. It will be apparent to those of skill in the art upon reading the foregoing description and examining the drawings, that many alternatives and modifications can be utilized without departing from the true nature of the invention disclosed herein. Accordingly, the scope of the invention is only to be limited as properly interpreted in accordance with the accompanying claims.

What is claimed is:

1. A multipiece truck roof fairing assembly comprising at least two horizontally divided sections configured for vertically stacked engagement to provide an operative fairing configuration having an aerodynamically efficient exterior surface, said sections further being configured to provide a transport configuration of said fairing assembly in which an upper of said horizontally divided sections is nestable within a lower of said horizontally divided sections, the nested sections being separated in said transport configuration, and a plurality of mounting brackets having first mounting means providing attachment of said lower of said horizontally divided sections thereto and configured to engage a truck cab roof for mounting of said lower section thereon, said brackets having second mounting means separate from said first mounting means providing attachment of said upper of said horizontally divided sections thereto independently of and within said lower section in said transport configuration.

2. The fairing assembly of claim 1 and an intermediate section disposed between said upper and lower sections in said operative fairing configuration, said brackets having third mounting means separate from said first and second mounting means providing for attaching said intermediate section thereto in said transport configuration.

3. The fairing assembly of claim 1 wherein said fairing sections engage one another by means of a tongue-in-groove connection to provide an aerodynamically continuous exterior surface across the joint between said fairing sections in said operative configuration of said fairing assembly.

4. The fairing assembly of claim 3 wherein said lower fairing section has an upper horizontal edge for engaging a lower horizontal edge of said upper fairing section, said lower fairing section having a vertically opening groove disposed along said upper horizontal edge on an interior side of said fairing section and said upper fairing section having a tongue depending downwardly from said lower horizontal edge and configured to matingly engage said groove.

5. The fairing assembly of claim 4 and an adhesive compound disposed in said groove, said sections being permanently attached by said adhesive compound in said operative configuration.

6. The fairing assembly of claim 3 wherein said lower fairing section has an upper horizontal edge for engaging a lower horizontal edge of said upper fairing section, said lower fairing section having a horizontal inwardly opening groove disposed along said upper horizontal edge on an interior side of said fairing section and said upper fairing section having a flanged lower horizontal edge having a tongue extending outwardly from said flange and configured to matingly engage said groove.

7. The fairing assembly of claim 6 and said inwardly opening groove comprising one of a plurality of parallel grooves and said tongue comprising one of a plurality of parallel tongues.

8. The fairing assembly of claim 6 and an adhesive compound disposed in said groove, said sections being permanently attached by said adhesive compound in said operative configuration.

9. The fairing assembly of claim 1 wherein said bracket has an angulated planar base member sized and configured to engage a portion of a truck cab roof underlying same.

10. The assembly of claim 9 wherein said base member has a plurality of upstanding flanges thereon, at least equal to the number of fairing sections, each of said fairing sections being attached respectively to a separate upstanding flange.

11. A multipiece fairing assembly comprising at least two fairing sections divided along a parting line configured for mutual attachment to provide an operative fairing configuration for attachment to a truck roof having an aerodynamically efficient exterior surface, one of said fairing sections having a groove disposed along said parting line on an interior surface of said fairing section, said groove being parallel to and offset inwardly of said interior surface and opening toward said parting line, the other of said sections having a tongue disposed along said parting line and extending parallel to and offset inwardly of an interior surface thereof and configured to matingly engage said groove.

12. The fairing assembly of claim 11 and an adhesive compound disposed in said groove, said sections being permanently attached by said adhesive compound in said operative configuration.

13. The fairing assembly of claim 11 and a plurality of brackets for attaching said fairing sections to said truck roof in a nested transport configuration prior to said mutual attachment, each of said brackets comprising first and second upstanding flanges, said one fairing section being attached to said first flange and said other fairing section being attached to said second flange.

14. A multipiece fairing assembly comprising at least two sections divided along a parting line configured for mutual attachment to provide an operative fairing configuration for attachment to a truck roof, said fairing having an aerodynamically efficient exterior surface including substantially level exterior surface across said parting line, one of said fairing sections having a U-shaped groove disposed along said parting line on an interior surface of said fairing section, said groove being substantially perpendicular to said interior surface and opening parallel to said parting line, the other of said sections having a flange disposed along said parting line and having a tongue extending from said flange substantially perpendicular to said interior surface and configured to matingly engage within said groove.

15. The fairing assembly of claim 14 and said groove comprising one of a plurality of parallel grooves and said tongue comprising one of a plurality of parallel tongues.

16. The fairing assembly of claim 14 and an adhesive compound disposed in said groove, said sections being permanently attached by said adhesive compound in said operative configuration.

17. The fairing assembly of claim 14 and a plurality of brackets for attaching said fairing sections to said truck roof in a nested transport configuration prior to said mutual attachment, each of said brackets comprising first and second upstanding flanges, said one fairing section being attached to said first flange and said other fairing section being attached to said second flange of said upper of said horizontally divided sections thereto independently of said one section in said transport configuration.

* * * * *